United States Patent Office 3,542,913
Patented Nov. 24, 1970

3,542,913
PROCESS FOR CAPPING CONTAINERS
William H. Robinson, New Vienna, and Gerald A. Shiffer, Wilmington, Ohio, assignors to Buckeye Molding Company, New Vienna, Ohio, a corporation of Ohio
Filed Dec. 28, 1967, Ser. No. 694,288
Int. Cl. B32b 7/06, 31/06
U.S. Cl. 264—242                     3 Claims

ABSTRACT OF THE DISCLOSURE

A process of forming a bead and/or seal at an extremity of a wall member of metal, glass, plastic, ceramic, paper and the like by molding bead material in a mold chamber into which the wall extremity is inserted. Upon setting, the bead material forms a bond with the wall material but not with the mold chamber. The process may be performed simultaneously with a closing and sealing operation in which a bead is formed on the open end of a container wall by molding the bead material in a cavity of desired shape in a closure for the container and simultaneously activating a sealing material to form a bond between another portion of the closure and another portion of the container wall.

FIELD OF INVENTION

This invention relates in general to new and useful improvements in the forming and/or joining together of materials and, more particularly, to improvements in closing and/or sealing of containers.

PRIOR ART

Applicants are not aware of any prior art that is considered pertinent. A prior application of Gerald A, Shiffer and David O. Allen, Ser. No. 625,073, filed Mar. 23, 1967, and commonly assigned with the instant application, discloses a method and/or apparatus for forming a container package wherein an intermediate material is employed in joining and/or sealing of individual components of the package.

SUMMARY AND OBJECTS

The problem of joining and/or sealing together a plastic material with a completely different kind of material presents difficult and complex problems.

In the packaging of feed and/or beverages as well as other merchandise, it is desirable to utilize plastic closure means that can be easily and economically produced in desired quantities and which are useful and effective to enclose various types of contents within various types of containers. Such closure means are used in conjunction with containers which may be made of many differing materials including plastics, metal or metal foil, glass, ceramic material, paper or other fiber-containing material, or a composite of two or more of such materials. When the container includes fiber-containing material, the surfaces of such material are often coated or otherwise provided with a fluid resistant barrier to avoid wetting of the fibrous material by contents of the container which may include fluid-containing material. However, cutting operations involved in the manufacture of such containers leave an uncoated edge which may act as a wick and absorb fluids by capillary action.

Containers made of these and other materials present additional complex and difficult problems. For example, prior to this invention, conventional commercial operations for manufacturing containers resulted in objectionbale imperfections such as extrusions, parting line seams, crizzles, crazes, dips and sinks on the sealing surface of the containers. And the use of highly complex, difficult and expensive processes to ostensibly achieve the degree of dimensional control required in attaining a desirable sealing finish of containers is not always commercially feasible.

Accordingly, it is an object of the present invention to provide an improved method and structure for obviating these difficulties.

Another object of the invention is to provide a method in which plastic flow of a plastic material within a confined space forms a seal and/or bead bonded to another element.

A further object is to provide a method in which plastic flow of a plastic material in a confined space provides a seal and effectively joins together a thermoplastic element to another element.

A further object is to provide an improved method whereby two members of similar or dissimilar materials may be joined together to provide a gas tight or fluid tight junction.

Still another object is to provide an improved method for sealing a member to prevent capillary action.

A further object is to provide an improved method for sealing a member to prevent capillary action and simultaneously joining said member to another member or members.

Another object is to provide an improved method of manufacturing containers wherein certain manufacturing operations can be eliminated and cost thereby reduced, and simultaneously to provide an improved product.

A further object is to provide an improved method whereby containers may be more rapidly, inexpensively and effectively sealed.

Still another object is to provide implementation of this invention in connection with commercially available containers to improve the fitting thereof with commercially available closures.

DESCRIPTION

These and other objects will be appreciated from the following description taken in connection with the accompanying drawings wherein.

Throughout the drawings, like elements bear like designations and it is to be understood that illustrations and descriptions are intended to be illustrative only and not limiting to the various modifications that may be made without departing from the invention.

Figure 1:
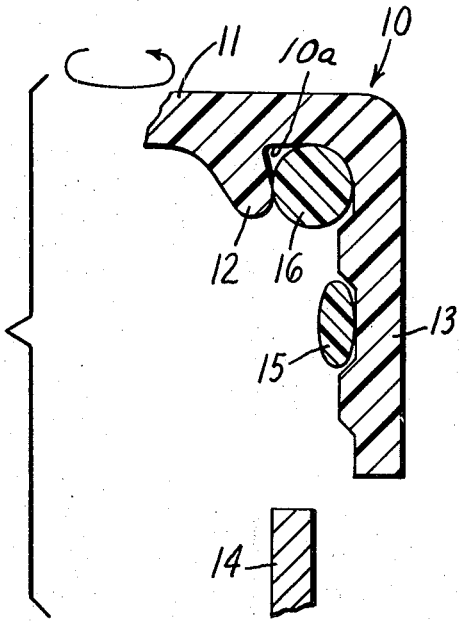
FIG. 1 is a fragmentary sectional view of a closure element together with a fragment of a container aligned therewith prior to being sealed and/or bonded in accordance with the invention.

In the drawings, there is shown a mold having a cavity or molding chamber therein corresponding to the shape, dimensions and configuration of a bead and/or seal to be formed on an extremity of a wall of a container. It is within the scope of the invention to utilize as the mold a plastic closure member 10 produced in accordance with known practices. In general, closure 10 comprises a top portion 11 with a depending internal rib 12 and depending outer skirt portion 13. The precise shape and configuration of closure 10 is not critical except that the inner surfaces of said top, rib and skirt portions constitute said cavity or molding chamber 10a for forming the bead and/or seal and, hence, are shaped and dimensioned to correspond with the shape and dimensions of container 14 on which bead 16 is to be formed, as well as the desired shape of the bead itself.

As noted above, when walls of container 14 are made of a fibrous or porous material, it is desirable to provide a seal for a cut edge thereof to prevent wicking action. When walls of container 14 are made of other materials such as glass, metal, ceramic and the like, it is desirable to make provision for insuring a good fit between the open end of container 14 and its closure 10. Both of these desirable features are achieved in accordance with the invention by forming and joining and/or bonding to the open end or edge of the wall of container 14 a bead 16 that encompasses said end or edge and thereby provides a resistant barrier to prevent wicking action if the wall of container 14 comprises fibrous or porous material. Additionally, by employing a cavity or mold chamber 10a within which bead 16 is formed and shaped, the invention provides means for insuring proper fit between the ultimately formed bead 16 and the closure into which it is to be received irrespective of variations of dimensions of the container wall that may occur during manufacturing. Accordingly, practice of the invention permits the use of broader manufacturing tolerances than those that would otherwise be acceptable and thus this is an important factor in reduction of overall manufacturing costs.

Bead 16 may be formed of various materials that, when cured, are capable of providing a fluid resistant barrier at the end of the wall of container 14 and capable of forming therewith a strong bond and which do not form such a bond with the surfaces of the cavity or mold chamber 10a. In other words, the material of which bead 16 is formed becomes plastic and moldable when subjected, for example, to heat and/or pressure, catalytic action, or solvent action, and also then exhibits strong adhesive characteristics with other materials such as the wall of container 14 and which, upon curing, hardens and forms a strong bond with the container wall.

Accordingly, bead 16 may be formed of various materials that are presently commercially available. For example, one type of such material is referred to in the aforesaid application of Shiffer and Allen. As noted therein, various types and grades of such material are presently available and are sold under various proprietary designations, and various polymers and/or copolymers of the vinyl family are illustrative of some of such materials. However, other materials may be employed in forming bead 16 if desired. For example, it is also within the scope of the invention to employ other materials, such as epoxy compounds or expandable materials, which when activated, as noted above, become moldable.

After formation, curing and bonding of bead 16 to the wall of container 14, while the bead is confined within cavity or mold chamber 10a, separation of bead 16 and closure 10 may be effected since the bead does not form a strong bond therewith. Since the bead 16 is now an integral part of container 14, closure 10 can be used repeatedly to re-close container 14.

Figure 2:
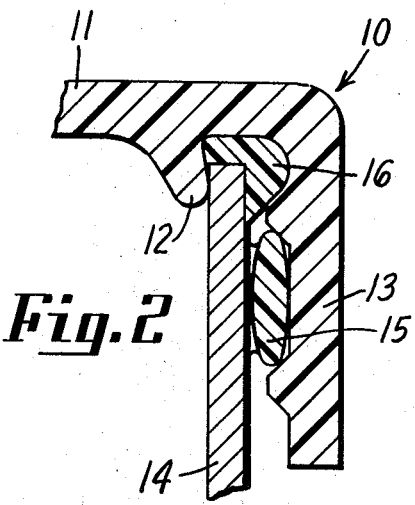
FIG. 2 is a fragmentary sectional view of the fragments of FIG. 1 after they have been sealed and/or bonded in accordance with the invention.
Figure 3:
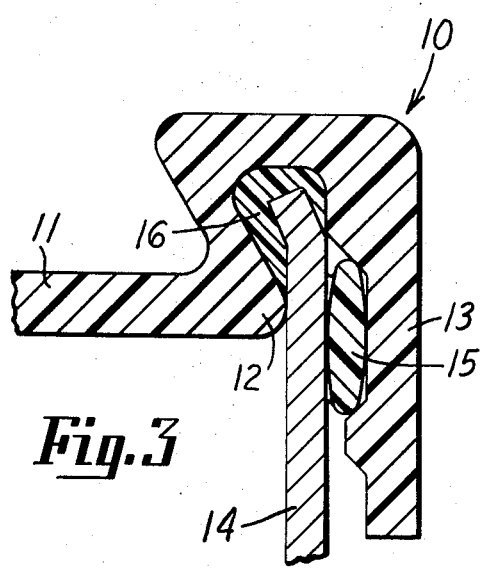
FIG. 3 is a fragmentary sectional view illustrating a modification of the embodiment of FIG. 2.
Figure 5:
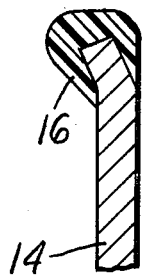

Material to form bead 16 is applied to the inner surfaces of said cavity or mold chamber 10a in any convenient and known manner, as by manual application or as by methods set forth in the above mentioned prior application of Shiffer and Allen, and is then activated to render it plastic and moldable. The open end or edge of the wall of container 14 is inserted into said cavity or mold chamber 10a and brought into contact with the material with sufficient pressure to form bead 16 (FIGS. 2 and 3). Bead 16 is then cured, allowed to cool or set in a known manner and thereby form a hardened bead 16 whereby the bead is bonded to the open edge of the container wall (FIG. 5). Closure 10 then may or may not be removed from bead 16 as noted heretofore.

If desired, the above described formation of a bead and/or seal may be combined with a spin sealing process for applying and sealing closure 10 to container 14. Bead material 16 is applied to the mold cavity or chamber 10a, as noted above, and a sealing compound 15 having good bonding characteristics with the material of closure 10 and also with the material of the wall of container 14 is also applied to an inner surface of skirt portion 13 of closure 10 as disclosed in the above mentioned application of Shiffer and Allen.

Figure 4:
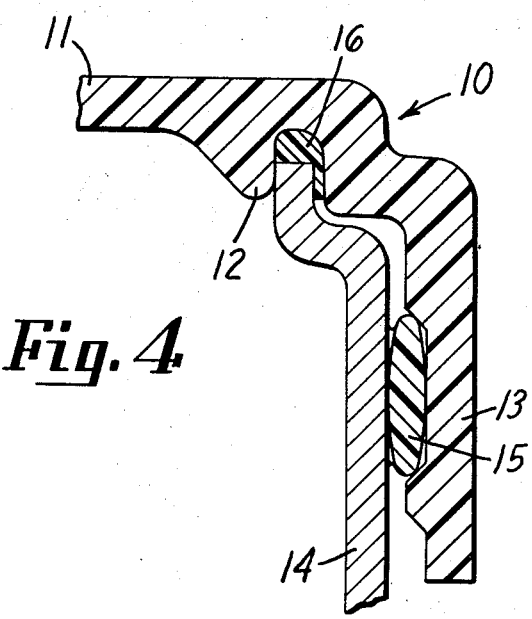
FIG. 4 is a fragmentary sectional view illustrating a modification of the embodiment shown in FIGS. 2 and 3; and, FIG. 5 is a fragmentary sectional view illustrating a bead formed on the end of a member in accordance with one aspect of the method of the invention.

In certain instances, and particularly if heat is to be generated locally by frictional contact as in the aforesaid Shiffer and Allen application, it is desirable to avoid establishing a bond prematurely between sealing compound 15 and container wall 14 prior to establishing frictional contact between the wall of container 14 and the material for forming bead 16. This is accomplished in accordance with the invention (FIG. 4) by providing the wall of container 14 and closure 10 with offset portions having suitable dimensions to provide substantially simultaneous contact between the respective surfaces of container 14 with materials 15, 16, or in such other timed sequence as may be desired as container 14 and closure 10 are caused to relatively move together. Alternatively, as shown in FIGS. 3, 5, the upper or open end portion of container wall 14 is flared inwardly to avoid premature contact between wall 14 and sealingly compound 15. This provides an additional advantage in that the bonding ultimately effected between bead 16 and the end of container wall 14 forms a bead that completely seals the open end or edge of the wall of container 14 and also portions of both sides thereof (FIG. 5) and thus provides an extremely effective seal to prevent possible absorption of fluid contents of the container.

While particular embodiments of the invention have been shown and described, it will be obvious to those skilled in the art that various changes, modifications and equivalents may be made without departing from the invention and it is intended in the appended claims to cover all such changes and modifications as fall within the true spirit and scope of the invention.

What is claimed is:

1. In a capping process for closing container means by closure means connectable with the open end wall of said container means, the improvement comprising providing flexible closure means having therein a mold chamber and an entrance to said mold chamber, said mold chamber having a shape corresponding to the configuration of said open end wall and a desired cross-sectional shape corresponding to the desired shape of a bead to be formed and secured to said end wall, introducing into said mold chamber a molding material which when activated becomes plastic and moldable, thereafter activating said molding material to render it plastic and moldable, inserting said open end wall into said mold chamber through said mold entrance and into said molding material while it is plastic and moldable thereby forming on said open end wall a bead conforming with the shape of said mold chamber, and solidifying and bonding said bead to said open end wall and removably connecting said closure means to said open end wall of said container means.

2. Process according to claim 1 wherein said closure means provided by said first mentioned step is reusable for readily detachable connection to said solidified bead.

3. Process according to claim 1 and additionally including the step of providing container means having sides of said wall adjacent said open end displaced relative to other portions of said wall whereby said solidified bead is bonded to said open end and both of said relatively displaced sides.

References Cited

UNITED STATES PATENTS

| | | | |
|---|---|---|---|
| 2,364,512 | 12/1944 | Bower | 264—242 |
| 2,630,237 | 3/1953 | Rosenlof | 220—42 |
| 2,817,454 | 12/1957 | Stover | 264—249 |

ROBERT F. WHITE, Primary Examiner

J. H. SILBAUGH, Assistant Examiner

U.S. Cl. X.R.

220—60; 264—262, 263